United States Patent
Amari et al.

(10) Patent No.: US 9,284,051 B2
(45) Date of Patent: Mar. 15, 2016

(54) ROTORCRAFT ROTOR FITTED WITH LEAD-LAG DAMPERS HOUSED IN SLEEVES CONNECTING BLADES TO A HUB OF THE ROTOR

(71) Applicant: AIRBUS HELICOPTERS, Marignane (FR)

(72) Inventors: Andre Amari, La Chapelle en Serval (FR); Jacques Gaffiero, Paris (FR)

(73) Assignee: AIRBUS HELICOPTERS, Marignane (FR)

( * ) Notice: Subject to any disclaimer, the term of this patent is extended or adjusted under 35 U.S.C. 154(b) by 464 days.

(21) Appl. No.: 13/937,660

(22) Filed: Jul. 9, 2013

(65) Prior Publication Data

US 2014/0017085 A1    Jan. 16, 2014

(30) Foreign Application Priority Data

Jul. 12, 2012  (FR) .................................... 12 01986

(51) Int. Cl.
  *B64C 27/51* (2006.01)
  *B64C 27/35* (2006.01)
  *B64C 27/635* (2006.01)
  *B64C 27/00* (2006.01)

(52) U.S. Cl.
  CPC ............. *B64C 27/51* (2013.01); *B64C 27/001* (2013.01); *B64C 27/35* (2013.01); *B64C 27/635* (2013.01)

(58) Field of Classification Search
  CPC ...... B64C 27/35; B64C 27/51; B64C 27/635; B64C 27/01
  See application file for complete search history.

(56) References Cited

U.S. PATENT DOCUMENTS

| | | | | |
|---|---|---|---|---|
| 4,178,130 | A * | 12/1979 | Ferris | ...................... B64C 27/51 416/107 |
| 4,235,570 | A | 11/1980 | Faiz et al. | |
| 5,141,398 | A | 8/1992 | Bietenhader et al. | |
| 5,732,905 | A | 3/1998 | Krysinski | |
| 8,356,977 | B2 * | 1/2013 | Jones | ...................... B64C 27/51 188/290 |
| 8,496,435 | B2 | 7/2013 | Nannoni et al. | |
| 8,622,703 | B2 * | 1/2014 | Girard | ...................... B64C 27/35 416/134 A |

(Continued)

FOREIGN PATENT DOCUMENTS

| | | |
|---|---|---|
| CN | 1053401 A | 7/1991 |
| CN | 101811573 A | 8/2010 |
| EP | 2223854 A1 | 9/2010 |

(Continued)

OTHER PUBLICATIONS

Search Report and Written Opinion; Application No. FR 1201986; dated Apr. 11, 2013.

(Continued)

*Primary Examiner* — Ninh H Nguyen
(74) *Attorney, Agent, or Firm* — Brooks Kushman P.C.

(57) ABSTRACT

A rotorcraft rotor fitted with a device for damping lead-lag oscillations of the blades (2) of the rotor. The blades (2) are hinge-mounted on a rotary hub (1) of the rotor via respective sleeves (3). The damper device comprises a set of dampers (6), each individually housed in a respective one of said sleeves (3) and deformable between two fastening points (8, 9), one with the sleeve and the other with an engagement member (7) for engaging the hub (1) via a linkage (10). For each of the sleeve (3), the damper (6) housed by a given sleeve (3) is in hinged engagement with the linkage (10) via a lever arm (11) hinged to the sleeve (3).

20 Claims, 3 Drawing Sheets

(56) References Cited

U.S. PATENT DOCUMENTS

| | | | |
|---|---|---|---|
| 8,764,396 B2 * | 7/2014 | Stamps | F16F 13/08 416/107 |
| 2010/0247312 A1 | 9/2010 | Girard et al. | |

FOREIGN PATENT DOCUMENTS

| | | |
|---|---|---|
| FR | 2653405 A1 | 4/1991 |
| FR | 2733961 A1 | 11/1996 |
| FR | 2943621 A1 | 10/2010 |

OTHER PUBLICATIONS

Notice of First Office Action of corresponding Chinese Application No. 201310287400.0; Dated: Feb. 16, 2015; 5 pages.

Notice of First Office Action of corresponding Chinese Application No. 201310287400.0; Dated: Feb. 16, 2015; 5 pages—English Translation.

* cited by examiner

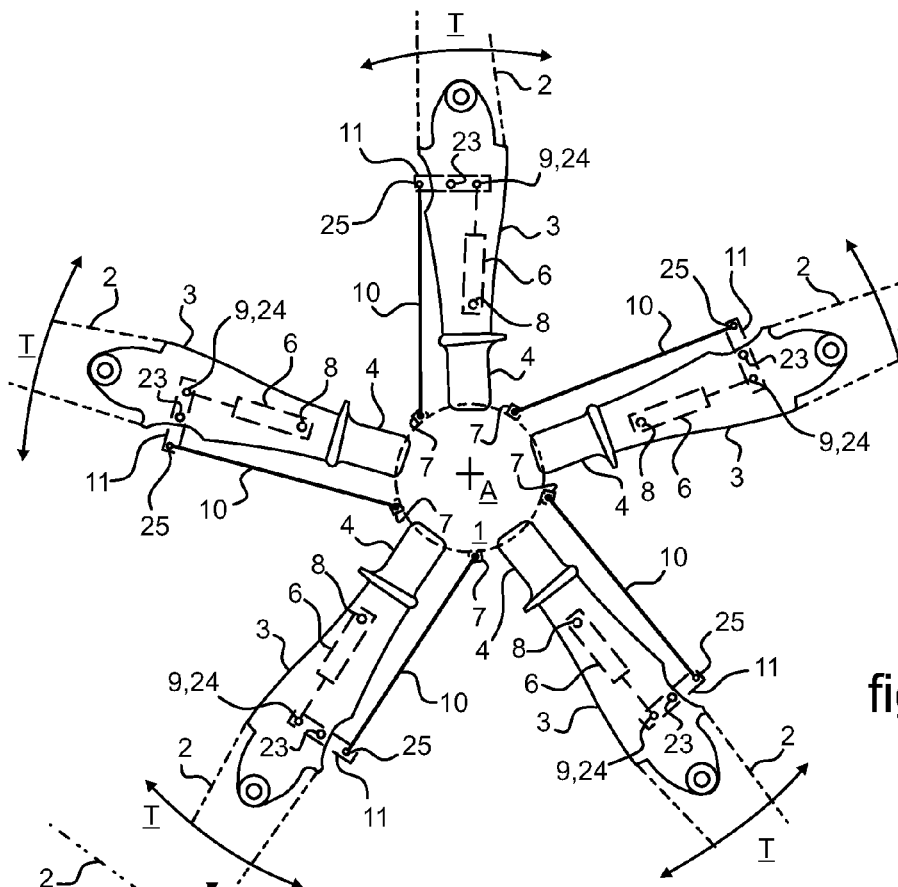
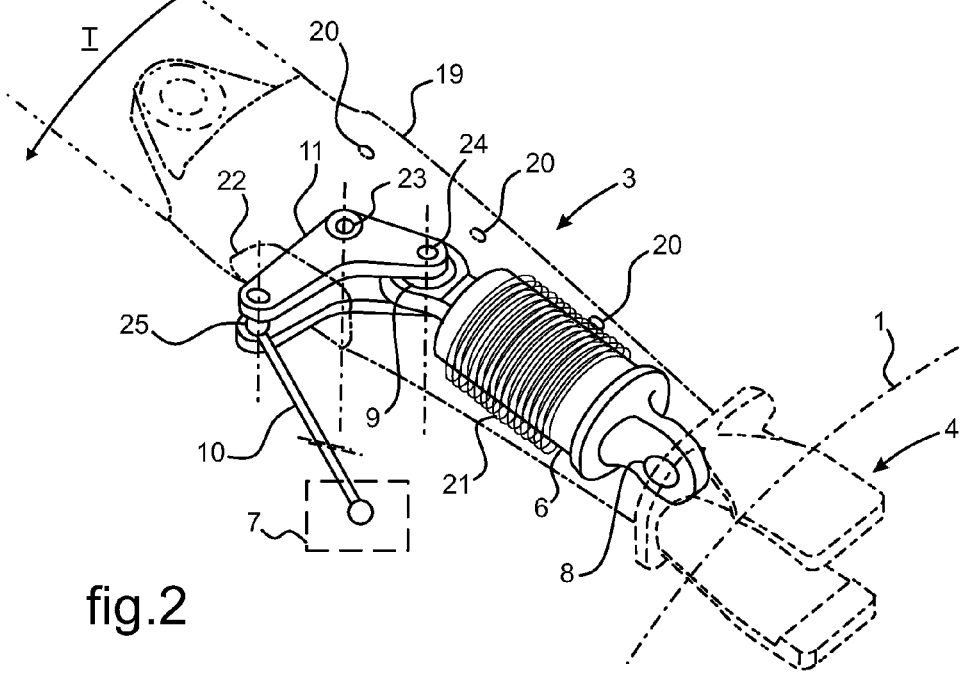

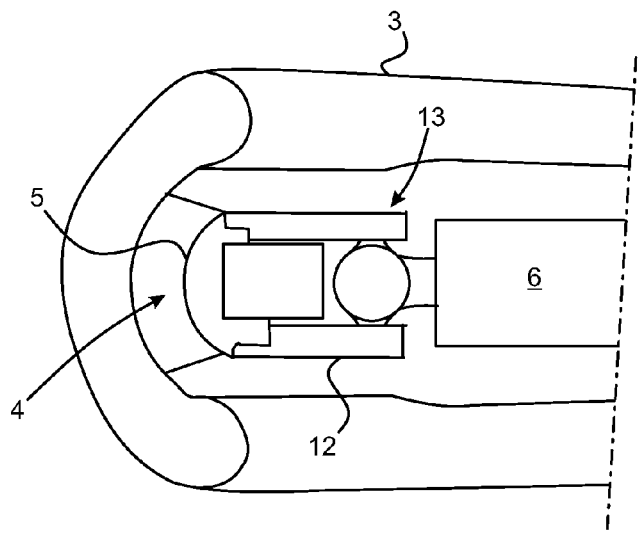
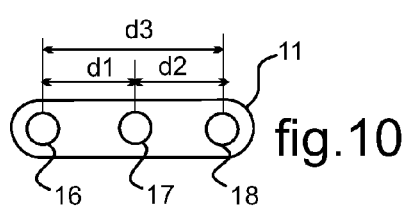
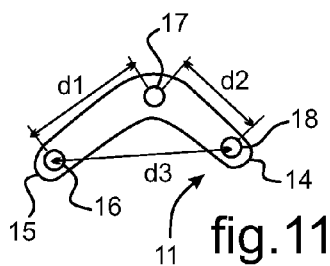
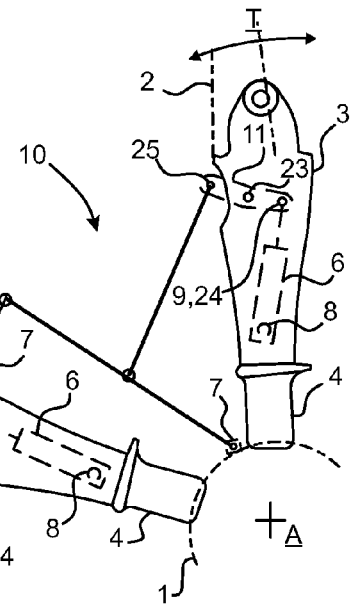
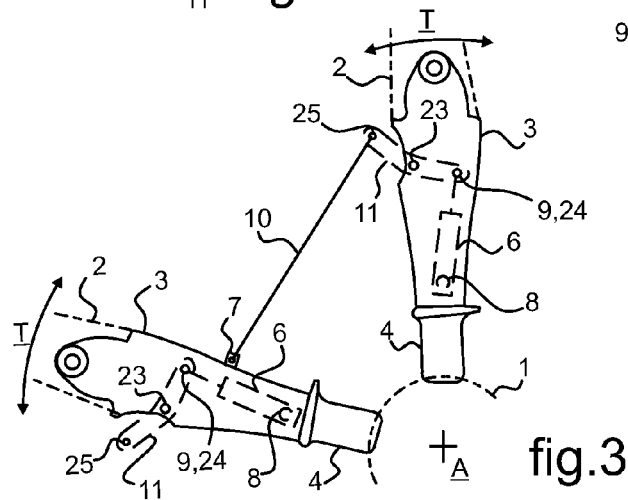

ROTORCRAFT ROTOR FITTED WITH LEAD-LAG DAMPERS HOUSED IN SLEEVES CONNECTING BLADES TO A HUB OF THE ROTOR

CROSS REFERENCE TO RELATED APPLICATIONS

This application claims priority to French patent application No. FR 12 01986 filed on Jul. 12, 2012, the disclosure of which is incorporated in its entirety by reference herein.

BACKGROUND OF THE INVENTION (1) Field of the Invention

The present invention relates to the field of rotorcraft rotors, and it relates more particularly to devices for damping the movements of blades fitted to such rotors.

The present invention provides a device for damping lead-lag oscillations of the blades of a rotorcraft rotor. More specifically, the present invention relates to ways of mounting a damper included in such a damper device on a hub of the rotor.

(2) Description of Related Art

Rotorcraft are aircraft with a rotary wing, with this classification including helicopters. A helicopter comprises in particular at least one main rotor with a substantially vertical axis that provides the rotorcraft in flight with lift, with propulsion, and with guidance. A helicopter also commonly has a tail rotor for providing it with yaw guidance, and possibly a propulsive propeller in the context of a high-speed and long-range helicopter, commonly referred to as a "hybrid" helicopter.

A rotorcraft rotor comprises a rotary hub driven in rotation by a power plant of the rotorcraft, with blades being mounted on the hub so as to be driven in rotation by the hub. The blades are mounted on the hub so as to be movable in pivoting about their own axes in order to enable the pitch of the blades to be varied at least collectively, as in a tail rotor or in a propulsive propeller, or else otherwise also cyclically as in a main rotor, in particular. Varying the collective or cyclic pitch of the blades of a rotor serves to modify the behavior in flight of the rotorcraft.

It is common practice for the blades to be mounted on the hub via connection members arranged as arms or as sleeves or as other analogous members for mounting a blade on the hub. Such a connection member, referred to below as a "sleeve", is interposed between the root of a blade and the hub. In order to allow said variations in blade pitch, sleeves are hinged to the hub, e.g. by means of a spherical abutment member, and they are movable in pivoting by a rod for controlling variation in blade pitch.

Since the blades are driven in rotation by the hub and since they are movable in the general plane in which they lie in order to vary their pitch, their individual behavior has the reputation of being complex, particularly for the blades of a main rotor.

It should be considered that the blades are subjected in rotation to forces that vary along their length. When the rotorcraft is hovering or in forward flight, the distribution of aerodynamic forces along a blade gives rise to a distribution of bending moments, and the value of the bending moment is very large at the blade root. When the rotorcraft is moving in translation, the "advancing" blade has an angle of incidence (or pitch) that is smaller than a "retreating" blade for which the pitch is increased in order to balance lifts.

Proposals have therefore been made to hinge the blades on the hub so that they can flap vertically about a flapping axis that is oriented orthogonally relative to the axis of rotation of the hub. When the rotary wing is set into rotation, the combination of centrifugal force and the lift forces causes the blades to tilt with vertical flapping so that the rotary wing takes up a somewhat conical shape, the plane of rotation of the blades being not necessarily the same as a plane orthogonal to the axis of rotation of the hub. In the mounting of a blade on the hub, account must also be taken of a facility for retracting the blades into a folded position of the rotary wing.

In this context, it should also be understood that the blades are also hinged to the hub to perform lead-lag movements in their plane of rotation about a lead-lag axis that is oriented substantially parallel to the axis of rotation of the hub. Such lead-lag hinging of the blades serves to avoid generating bending moments in the blades in their plane.

Nevertheless, the individual oscillations of the blades about their lead-lag axes give rise to a known phenomenon of the rotorcraft presenting ground resonance. Such a phenomenon has the reputation of being potentially dangerous in the event of the resonant frequency of oscillation of the blades about their lead-lag axes coming close to a resonant frequency of the aircraft on the ground. Such a problem arises mainly for the main rotor, however it must also be taken into consideration for other rotary wings of a helicopter, such as for the tail rotor, where consideration needs to be given to the resonant modes of oscillation of the tail boom carrying the tail rotor.

In order to remedy that problem, it is known to fit rotors with damper devices for damping the lead-lag oscillations of the blades about their lead-lag axes. Various damper devices have been developed that make use of elastically deformable dampers. Each damper is in hinged engagement both with a member for engaging the hub via linkage and with a blade that is associated with the damper. Specifically, the linkage comprises one or more links or other analogous elements for transmitting mechanical forces.

The ability of the damper to deform elastically between two fastening points is used in particular for damping the lead-lag oscillations of at least the blade with which it is associated. The damper is placed under elastic deformation stress between said fastening points. One of the fastening points of the damper, considered as being a "distal" fastening point, is anchored via the linkage to a member for engaging the hub. The other of said fastening points of the damper, considered as being a "proximal" fastening point, is engaged with said blade that is associated therewith.

In various possible configurations, the member for engaging the damper with the hub is arranged on a neighboring blade or is incorporated in the hub. The engagement of the damper at its proximal fastening point with a said blade with which it is associated may potentially take place via the sleeve carrying the blade. Still among the various possible configurations of greater or lesser complexity seeking to ensure that the damper is stressed in a manner that matches requirements, the distal fastening point of the damper, and possibly also its proximal fastening points, are in hinged engagement with a link. Such a link may itself potentially be hinged to other links that are hinged to one another and/or to the hub and/or possibly to the sleeve of a blade.

The dampers used may be arranged in various ways. For example, the dampers may be of elongate shape and work in compression/traction, or they may be of cylindrical shape and work in twisting. A damper of cylindrical shape presents the advantage of having an arrangement that is compact and also presents the advantage of being easy to install in a sleeve used for connecting the blade to the hub.

By way of example, proposals are made in document FR 2 943 621 (Eurocopter SAS), to house a lead-lag damper of cylindrical shape inside a said sleeve. The proximal fastening point of the damper is fastened to the sleeve, while its distal fastening point is connected via a link to a said engagement member incorporated in the hub.

By way of example, reference may also be made to the following documents: FR 2 653 405 (Aerospaciale Société Nationale Industrielle SA); FR 2 733 961 (Eurocopter France SA); and EP 2 223 854 (Agusta SPA), those documents relating to installing dampers on a rotor in various configurations of greater or lesser complexity.

It has been found that installing dampers inside the sleeves, as disclosed in document FR 2 943 621 (Eurocopter SAS), gives rise to various other advantages. Dampers that are installed outside sleeves give rise to aerodynamic drag that it is desirable to avoid. Furthermore, installing dampers inside the sleeves makes it possible to protect them from the hostile environment of the rotor.

Nevertheless, it has also been found that installing dampers inside the sleeves is made easier when the dampers are of cylindrical shape. Such a damper can easily be anchored inside a sleeve and can be put into hinged engagement with the hub via a said link. Such an installation is difficult to arrange for a damper of any structure.

It is thus found that the solution proposed in document FR 2 943 621 (Eurocopter SAS) is applicable for a rotorcraft of given structure and as a function of specific needs for damping lead-lag oscillations of blades. It is difficult or even inappropriate to transpose the use of that solution with any rotorcraft that might present a variety of structures.

As mentioned above, the requirements for damping lead-lag oscillations of blades are closely associated with said phenomena of resonance, and therefore with the power and the structure specific to the rotorcraft. It is appropriate for the installation of the damper in the sleeve to avoid constituting any obstacle to optimizing potential configurations for installing other members of the damper device on the rotor. It would be advantageous for various linkage configurations adapted to the specific requirements for damping lead-lag oscillations of the blades to be made potentially available without requiring any major structural modification to the damper device.

BRIEF SUMMARY OF THE INVENTION

It should thus be considered that one of the objects of the present invention is to provide freedom in arranging the damper device as a function of specific requirements of a rotor, as a result of it being easy to adapt the general organization of a basic damper device that is easy to modulate.

The present invention thus seeks to benefit in preferred manner from the advantages procured by installing dampers inside sleeves or analogous connection members suitable for protecting dampers from the outside environment. A choice of the present invention is to limit the aerodynamic drag generated by the damper device and to preserve the dampers as well as possible from the hostile environment of the rotor.

On the basis of this choice, it is also desired in the present invention to provide a device for damping lead-lag oscillations of blades and that is suitable for use on any rotorcraft with adaptations that are simple, without major structural modification, and regardless of the specific structure and of the specific requirements of that rotorcraft for damping lead-lag oscillations of the blades of the rotor(s) with which it is fitted.

In this context, the present invention provides a rotorcraft rotor fitted with a device for damping lead-lag oscillations of the blades of the rotor, and it also provides a rotorcraft fitted with such a rotor.

More particularly, the present invention seeks to propose such a rotor in which the damper device comprises dampers housed in sleeves providing a connection between the blades and a hub of the rotor, while taking account of all of the potential beneficial advantages and of the constraints and/or difficulties to be overcome, as mentioned above.

The rotorcraft rotor of the present invention is fitted with a damper device for damping lead-lag oscillations of the blades of the rotor. The blades are individually hinged-mounted on a rotary hub of the rotor via respective sleeves. Each sleeve is hinged to the hub, at least about a lead-lag axis that is oriented substantially parallel to the axis of rotation of the hub.

The damper device comprises a set of dampers, each individually housed in a said sleeve. It should be considered that the sleeves are connection members between the blades and the hub, without that prejudging the specific arrangement of any such sleeve. The use of the term "sleeve" for such a connection member should not be understood narrowly in the general approach of the present invention, but rather covers any connection member formed by such a sleeve that is suitable mainly for movably mounting the blade on the hub. Such a connection member advantageously also provides a housing for receiving a said damper, enabling it to be protected from the hostile environment of the rotor and enabling the aerodynamic drag generated by the damper device to be limited.

Nevertheless, it is preferable for the connection member to be structurally arranged as a hollow member such as a sleeve or the like. Such a sleeve advantageously provides an axial chamber in its inside recess suitable for receiving various functional members. Such functional members are potentially associated with the freedom of the blade to move relative to the hub, such as for example a spherical abutment member interposed between the sleeve and the hub.

In the context of the present invention, a said axial chamber of a sleeve is advantageously suitable for housing a said damper without it being necessary to provide the connection member with a housing specifically for receiving the damper. Nevertheless, it should be understood that the damper may be housed in any housing of the sleeve or in any other analogous connection member between the blade and the hub that includes such a housing suitable for receiving a said damper, in order to limit the aerodynamic drag that the damper might generate and in order to protect it from the outside environment, in particular from the hostile surroundings constituted by the rotor. For example, when using a connection arm between the blade and the hub, such a connection arm may include a casing or an analogous wall providing a housing for receiving the damper like a sleeve.

Each damper is elastically deformable between two fastening points via which fastening points the damper is placed under stress between the sleeve housing it and an engagement member for engaging the hub via a linkage. Between its elastically deformable means, each damper has opposite fastening points, comprising a proximal fastening point and a distal fastening point.

These fastening points are in hinged engagement respectively with the sleeve housing the damper and with a said member for engaging the damper with the hub via the linkage. Under such conditions, various configurations should be taken into consideration in which each damper is placed under stress depending on the lead-lag oscillations of at least the blade having the sleeve that houses a given damper, and possibly also of the lead-lag oscillations of a blade adjacent to said blade, and with which adjacent blade said given damper is in engagement via the linkage.

According to the present invention, such a rotorcraft rotor is mainly recognizable in that for each of the sleeves, the damper housed by a given sleeve is in hinged engagement with the linkage via a lever arm hinged to the sleeve.

The lever arms with which the sleeves are individually fitted are force transmission elements hinged to the sleeves and used in association with the linkages providing individual connections between the dampers and the members for engaging the linkages to the hub. The conditions under which the dampers are stressed are easily adapted by modifying the relative positions on the lever arms of: the hinge between a lever arm and the sleeve; the hinge between a lever arm and the linkage; and the hinge between a lever arm and the damper. The specific conditions under which dampers are stressed can be adjusted to match the damping requirements that need to be satisfied by means of said easy adaptation of the lever arms.

In addition, the lever arms are intermediate connection members between the dampers and the linkages with which the dampers are respectively engaged via the lever arms. The lever arms are preferably pivotally hinged on the sleeves, with such intermediate connections between the dampers and the linkages making it possible to avoid causing the dampers to withstand forces departing from those seeking to damp the lead-lag oscillations of the blades. Each lever arm is pivotally mounted on the associated sleeve about a pivot axis that is preferably parallel to the lead-lag axis of the blade carried by the sleeve.

The general structure of the damper device is easily transposable to any rotor fitted to any rotorcraft. The advantageous mounting of the dampers housed within the sleeves does not constitute an obstacle to using the damper device on a variety of rotors having specific damping requirements for lead-lag oscillations of their blades. Such a variety of conditions of use can be achieved without major structural modification of the damper device, as a result of adapting the lever arms, which is easy to do, and more particularly adapting said positions of the various hinges relative to one another on the lever arms.

Said adaptation of a lever arm lies in particular in adapting:
 its general shape and more particularly the angle potentially formed between the branches of the lever arm having the various hinges arranged thereon;
 the distances between various ones of said hinges; and
 the distribution on the lever arm of the neighborhood of said hinges relative to one another.

Adjusting the working conditions of the dampers by said adaptation of the lever arms enables the way in which the dampers operate to be selected freely depending on the damping requirements and/or on a specific configuration of the rotor. Such freedom of choice relates in particular to the general capacities of the dampers in terms of elastic deformation or relative to the specific structure of the dampers, such as for dampers that may respectively be of an elongate shape or of a cylindrical shape.

Furthermore, when using dampers of elongate shape, the position of the hinge of the lever arm on the sleeve may be spaced apart to a greater or lesser extent relative to the lead-lag pivot axis of the sleeve on the hub. More particularly, and depending on the needs of a given rotor, the respective positions of the distal and proximal fastening points of the dampers relative to the lead-lag pivot axis of the sleeve on the hub may be inverted. More particularly, the dampers may advantageously be selected to be of elongate shape, being in particular like cylindrical actuators. Relative to the lead-lag pivot axis of the sleeve on the hub, the positions of the hinges respectively of the damper cylinder with the sleeve and of the damper piston with the lever arm can be selected freely relative to each other depending on the position desired for the hinge of the lever arm with the sleeve.

Adjusting the working conditions of dampers by adapting the lever arms also makes it possible to use dampers of given structure with linkages of arbitrary structure, and in particular makes it possible to simplify the configuration of such linkages by using the force transmission characteristics obtained by the lever arms and the characteristics specific to the dampers.

More particularly, the lever arms fitted to the sleeves are advantageously tools for adjusting lead-lag oscillation damping characteristics of the blades by the damper device, depending on the relative positions on a given lever arm between the hinge of the lever arm with the sleeve, the hinge of the linkage with the lever arm, and the hinge of either one of the fastening points of the damper with the lever arm.

The damper housed in a given sleeve is in particular in hinged engagement at either one of its said fastening points with the linkage via the lever arm, said fastening point being considered as a distal fastening point. The damper is also in hinged engagement at the other one of its said fastening points with the sleeve, or possibly via the hub as described below, this fastening point being considered as being a proximal fastening point.

More particularly, the damper housed in a given sleeve is in hinged engagement with the sleeve housing a said fastening point that is considered as being proximal. This proximal fastening point is in engagement either directly with the sleeve or indirectly via a structure of the hub used for mounting the sleeve on the hub.

In a preferred embodiment, for each of the sleeves and relative to a given sleeve, the linkage is hinged via a ball-joint to the lever arm and the lever arm is hinged via a pivot to the sleeve, about a pivot axis orientated parallel to the lead-lag axis of the blade carried by the sleeve. The damper may equally well be hinged either via a pivot or via a ball-joint hinged at its fastening points respectively to the lever arm and to the sleeve, possibly via the hub.

More specifically, and in an advantageous embodiment, the sleeves are individually mounted on the hub via respective spherical abutment members. Under such circumstances, the damper housed in a given sleeve is optionally in hinged engagement with that sleeve via a mounting structure for mounting the spherical abutment member on the hub, e.g. via a fork for hinging the hub to the proximal fastening point of the damper. The forces to which the dampers are subjected are advantageously taken up by the hub, thereby sparing the sleeves.

In various potential arrangements for the lever arm, the lever arm is of generally rectilinear shape, for example, or else it is of generally dihedral shape, likewise for example, or analogously it may be arcuate. The dihedral is defined in particular by a pair of branches making up the lever arm.

In an embodiment in which the lever arm is of a dihedral shape, the linkage and the damper are preferably hinged respectively to the free ends of the branches, with the rigid junction zone between the branches being used for providing the hinge between the lever arm and the sleeve.

In various possible alternative configurations:

the hinge of the damper and the hinge of the linkage with the lever arm are arranged on either side of the hinge of the lever arm with the sleeve;

the hinge of the lever arm with the sleeve is arranged at one end of the lever arm, and the hinge of the damper and the hinge of the linkage with the lever arm are both arranged at the other end of the lever arm; and the hinge of the linkage with the lever arm is arranged between the hinge of the lever arm with the sleeve and the hinge of the damper with the lever arm.

The damper may equally well be a cylindrical damper providing damping in twisting or an elongate damper providing damping in traction/compression.

When the damper is an elongate damper extending inside the sleeve in the general direction in which the sleeve extends, with one of its ends, considered as being a distal end, being hinged to the lever arm, and with the other end of its ends, considered as being a proximal end, being hinged equally well either directly to the sleeve or else to the hub, considered as being an intermediate member between the sleeve and the proximal fastening point of the damper.

Nevertheless, it is preferred to hinge the damper to the sleeve, in particular at its end close to the hub, so as to enable the damper to be hinge-mounted in pivoting at each of its ends, respectively to the lever arm and to the sleeve, and/or to enable the lever arm to be pivotally hinged to the sleeve. When the proximal fastening point of each of the dampers is hinged directly to the hub, such a hinge is of the ball joint type in order to accommodate the various movements needed by the sleeve relative to the hub.

Mounting the damper inside the sleeve that houses it advantageously makes it possible to use a damper of elongate shape. The structure and the operating characteristics of such dampers give them advantageous reliability and long life, and make it easy to adjust the conditions specific to their own stresses for damping the lead-lag oscillations of the blades. Such elongate dampers are easily transposable depending on their characteristics from any rotor to any other rotor depending on requirements. In addition, hinge-mounting of such elongate dampers inside the sleeves is made easier.

For example, the sleeve is arranged as a cover for confining the damper and for housing the lever arm. Said cover has a window passing therethrough for passing a branch of the lever arm to which the linkage is hinged.

The potential arrangements of sleeves may be diverse, providing such a sleeve advantageously provides a cover forming an aerodynamic shield masking and/or sheltering the damper that receives it. Sleeves with internal hollows make it easy to confine the dampers while limiting overall size and without degrading the ease with which the damper device can be adapted to any rotor of any rotorcraft. Each sleeve houses a damper and practically all of the lever arm with which the damper is in hinged engagement, with the exception with a portion of the lever arm that emerges outside said cover in order to be put into hinged engagement with the linkage. Such an emerging portion of the lever arm may potentially be restricted to the end of one of the branches to which the linkage is hinged.

Each sleeve preferably includes means for cooling the damper that it houses. Since the dampers are advantageously housed inside the sleeves, such cooling means can be used and easily organized as a function of the specific working conditions of the dampers.

Such cooling means may easily be installed on the sleeves, e.g. being arranged as forced-air passages through the walls of the sleeves defining said cover. The efficiency with which dampers are cooled by admitting a stream of air into the inside of the sleeves may, if necessary, be associated with installing or incorporating finned heat exchangers or the like with the bodies of the dampers.

More particularly, for each of the sleeves and relative to a given sleeve, the cover formed by the sleeve includes at least one forced-air passage passing therethrough for cooling the damper.

Still more particularly, for each of the sleeves and relative to a given sleeve, a damper housed in the sleeve is provided with a finned heat exchanger.

Said engagement member engaging the linkage with the hub may in particular be an attachment member incorporated equally well with the hub or with a sleeve adjacent to the sleeve housing the damper engaged with said linkage. The linkage may comprise at least one transmission element, if not a set of hinged-together transmission elements.

The advantages provided by the lever arms for adapting the operating modes of the damper device of the invention to requirements can easily be associated with free adaptation of the configuration of the linkages. The linkages may comprise one or more hinged-together links, or indeed lever arms interposed between the links. With same ways in which the dampers are mounted inside the sleeves via specific lever arms, the configuration of the linkages is easily adaptable depending on the requirements of a given rotor, and may possibly be simplified.

The present invention also provides a rotorcraft fitted with a rotor as described above.

BRIEF DESCRIPTION OF THE SEVERAL VIEWS OF THE DRAWINGS

Embodiments of the present invention are described with reference to the figures of the accompanying sheets, in which:

FIG. 1 is a fragmentary view of a rotorcraft rotor fitted with a device for damping lead-lag oscillations of blades of the rotor, in an embodiment of the present invention;

FIG. 2 is a view of a sleeve providing a connection between a blade and a hub of a rotorcraft rotor, the sleeve housing a damper hinged to the sleeve in another embodiment of the present invention;

FIGS. 3 to 8 are fragmentary views of rotorcraft rotors fitted with damper devices in respective embodiments in accordance with a rotor of the present invention;

FIG. 9 is a view of a proximal end of a sleeve providing a connection between a blade and a hub of a rotorcraft rotor, in another embodiment of the present invention; and FIGS. 10 and 11 are views of respective embodiments of a lever arm included in a damper device fitted to a rotor of the present invention.

DETAILED DESCRIPTION OF THE INVENTION

Figure 5:
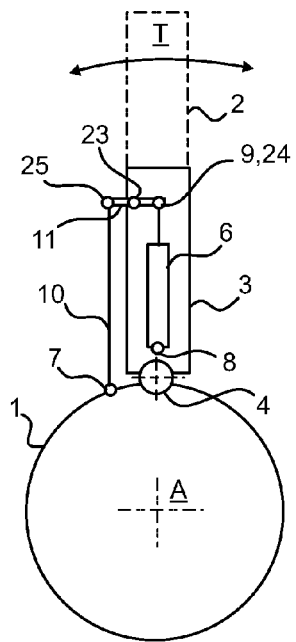
Figure 6:
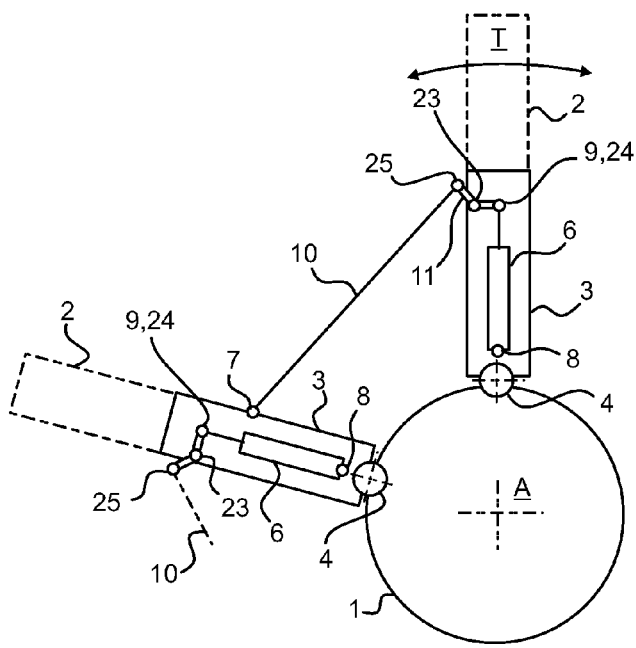

In FIGS. 1 to 8, a rotorcraft rotor comprises a rotary hub 1 having blades 2 mounted thereon to be driven in rotation. The blades 2 are radially distributed around the hub 1, being assembled to the hub 1 via respective sleeves 3. Each blade is individually carried by a sleeve 3 that is movably mounted on the hub 1 via hinged junction means 4. By way of example, such junction means 4 advantageously involve a spherical abutment member 5 as shown in FIG. 9.

In the embodiments shown, the blades 2 are secured to the respective sleeves 3 by assembling the blade roots to the sleeves 3. In analogous manner, the blades 2 may be secured to the sleeves 3 by being made integrally therewith.

While the rotor is in rotation, the blades 2 are subjected to lead-lag oscillations T that need to be damped. Such lead-lag oscillations T take place about respective lead-lag pivot axes of the sleeves relative to the hub. Such a lead-lag pivot axis is substantially parallel to the axis A of rotation of the hub 1. In order to damp lead-lag oscillations T of the blades 2, the rotor is fitted with a damper device, which in broad terms comprises respective dampers 6 interposed between the sleeves 3 and engagement members 7 engaging the hub 1, either directly or indirectly via a blade 2. The respective configurations in which the dampers 6 are mounted on a rotor are similar from one damper 6 to another.

For each of the dampers 6, the damper 6 is engaged with opposite fastening points 8, 9 fastened respectively to a sleeve 3 housing the damper and a member 7 for engaging the hub 1. The damper 6 is a member that is elastically deformable between its said fastening points 8 and 9, and it is potentially of a cylindrical shape working in torsion or of an elongate shape working in traction/compression, as shown in the figures.

Figure 7:
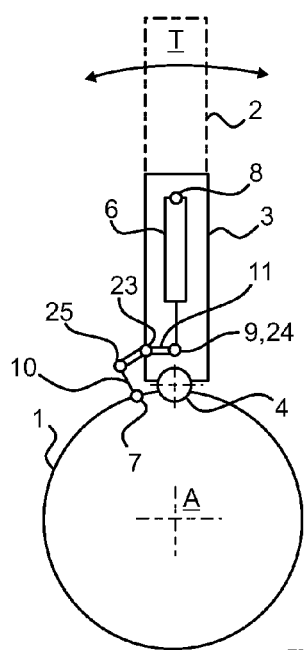
Figure 8:
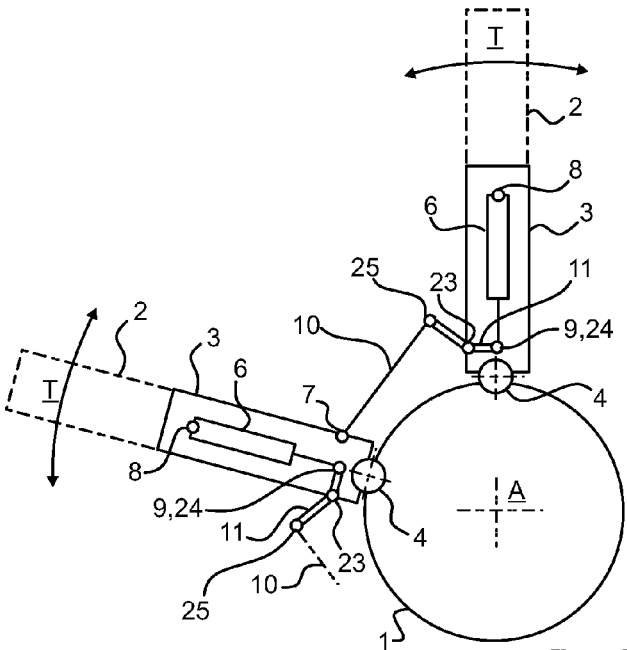

More particularly, a distal fastening point 9 for each damper 6 is in hinged engagement with a first end of a linkage 10. Each linkage 10 is also in hinged engagement with a said engagement member 7 that is associated therewith at a second end of the linkage 10 opposite from its first end. The linkages 10 are in hinged engagement with the hub 1, either directly, as shown in FIGS. 1, 5, and 7, or else indirectly as shown in FIGS. 3, 4, 6, and 8. An indirect engagement between a linkage 10 and the hub 1 is provided in particular via a sleeve 3 adjacent to the sleeve 3 housing the corresponding damper 6 in hinged engagement with the linkage 10 under consideration.

In various embodiments, the linkages 10 may comprise respective single links, as shown in FIGS. 1, 3, and 5 to 8, or they comprise a plurality of hinged-together links as shown in FIG. 4. The link(s) is/are considered in general terms as being elements for transmitting mechanical forces, with such force transmission elements being configured in various potential configurations between the ends of the linkages 10. The linkages 10 may comprise various force transmission elements, and in particular not only one or more links, but also other mechanical force transmission elements such as lever arms, or indeed auxiliary dampers interposed on the overall configuration of a linkage 10 between its ends.

Other configurations for arranging linkages 10 may be used depending on the lead-lag damping requirements of the blades 2, where such requirements depend on the general structure of the rotor and/or on the characteristics of the rotorcraft fitted with such a rotor.

Each sleeve 3 individually houses a damper 6, the damper 6 being in hinged engagement with a linkage 10 via a lever arm 11. The lever arm 11 is itself hinged to the sleeve 3 housing the damper 6, in particular in pivoting. It is remarkable that each damper 6 is in hinged engagement at each of its fastening points 8 and 9 with the sleeve 3 that houses it. The distal fastening point 9 of the damper 6 is in hinged engagement via a said lever arm 11, both with a linkage 10 and with the sleeve 3 housing the damper 6. The proximal fastening point 8 of the damper 6 is in hinged engagement with the sleeve 3, either directly or, more marginally, via the hub 1 as shown in FIG. 9.

More precisely in FIG. 9, any sleeve 3 of the engagement houses a damper 6 that is in hinged engagement at its proximal fastening point 8 with the hub 1. A spherical abutment member 5 is interposed between the hub 1 and the sleeve 3 to provide a hinged junction between them. Advantage is taken of a mounting structure 12 for mounting the spherical abutment member 5 on the hub 1 to hinge the damper 6 to the hub 1. The hub 1 is provided with a hinge member 13 of the proximal fastening point of the damper 6 to the hub 1, such as a fork, for example. Such a hinge member 13 is advantageously easily incorporated in said mounting structure 12.

For a given lever arm, each lever arm 11 has: a hinge engagement 23 of the lever arm to said sleeve 3, preferably a pivot; a hinge engagement 24 of the lever arm 11 to the distal fastening point 9 of the damper 6, which engagement is potentially a ball joint but is preferably a pivot; and a hinge engagement 25 of the lever arm 11 to the linkage 10, which engagement is a ball joint.

The lever arms 11 are suitable for being arranged in various ways depending on the requirements for damping lead-lag oscillations of the blades 2. The lever arms 11 constitute not only members for hinging the dampers 6 to the sleeves 3 individually housing them, but also force transmission members interposed between each linkage 10 and the corresponding damper 6. The structural characteristics of such a force transmission member arranged as a lever arm 11 can easily be adapted to vary the conditions under which the damper 6 is stressed, depending on requirements.

More particularly, the lever arms 11 are mechanical force transmission members having structural characteristics and hinge points with the linkages 10 and with the dampers 6 that are respectively associated with said lever arms 11 that can easily be adapted depending on the looked-for conditions under which the damper is to be stressed in order to damp the lead-lag oscillations of any rotor fitted to any rotorcraft.

For example, each lever arm 11 may be of rectilinear shape with branches that are arranged in line with each other, as shown in FIG. 10, or it may have intersecting branches 14, 15 forming a dihedral, which may more particularly be arcuate, or L-shaped, as shown in FIG. 11.

Each lever arm 11 has three hinge zones 16, 17, 18. By way of example, a middle hinge zone 17 is used for hinging the lever arms 11 to the sleeve 3. The other two hinge zones 16 and 18 are arranged on either side of the middle hinge zone 17, at the ends of the branches 14 and 15 making up the lever arm 11. By way of example, said other hinge zones 16 and 18 may be allocated respectively to the hinge between a damper 6 and the lever arm 11, and to the hinge between a linkage 10 and the lever arm 11.

In various embodiments based on seeking to match the stresses applied to the dampers with requirements, these hinge zones 16, 17, and 18 may be allocated in various ways to one or another of said hinges. Furthermore, the distances d1, d2, and d3 between the various hinge zones 16, 17, and 18 may be adapted in order to vary the characteristics of the lever arm 11 in use, depending on requirements.

In FIG. 2, the sleeve 3 has a wall providing a cover 19 for confining the damper 6. In the embodiment shown, such a cover 19 advantageously defines the internal hollow of the sleeve 3. The cover 19 has a window 22 through which the lever arm 11 emerges outside the sleeve 3 in order to enable the lever arm 11 to be put into hinged engagement with the linkage 10.

Where necessary, depending on the conditions under which the damper 6 is to be stressed, cooling means may advantageously be used for cooling the damper 6. For example, such cooling means may comprise forced-air passages 20 provided through the cover 19. Such forced-air passages 20 may be associated with a finned heat exchanger 21 fastened on or incorporated in the body of the damper 6.

What is claimed is:

1. A rotorcraft rotor fitted with a damper device for damping lead-lag oscillations of the blades of the rotor, the blades being individually hinge-mounted on a rotary hub of the rotor via respective sleeves, each sleeve being hinged to the hub, at least about a lead-lag axis oriented substantially parallel to the axis of rotation (A) of the hub, the damper device comprising a set of dampers each individually housed in a said sleeve, each damper being elastically deformable between two fastening points via which fastening points the damper is placed under stress between the sleeve housing it and an engagement member for engaging the hub via a linkage, wherein for each of the sleeves, the damper housed by a given sleeve is in hinged engagement with the linkage via a lever arm hinged to the sleeve.

2. A rotorcraft rotor according to claim 1, wherein the lever arms fitted to the sleeves are tools for adjusting lead-lag oscillation damping characteristics of the blades by the damper device, depending on the relative positions on a given lever arm between the hinge of the lever arm with the sleeve, the hinge of the linkage with the lever arm, and the hinge of either one of said fastening points of the damper with the lever arm.

3. A rotorcraft rotor according to claim 1, wherein the damper housed in a given sleeve is in hinged engagement at either one of its said fastening points with the linkage via the lever arm, and is in hinged engagement at the other one of its said fastening points with the sleeve.

4. A rotorcraft rotor according to claim 1, wherein the damper housed in a given sleeve is in hinged engagement with the sleeve housing it at a proximal fastening point, either directly with the sleeve or indirectly via a structure of the hub used for mounting the sleeve on the hub.

5. A rotorcraft rotor according to claim 1, wherein:
the linkage is hinged via a ball joint to the lever arm;
the lever arm is hinged via a pivot to the sleeve about a pivot axis orientated parallel to the lead-lag axis of the blade carried by the sleeve; and
the damper is hinged either via a pivot or via a ball joint at its fastening points respectively to the lever arm and to the sleeve.

6. A rotorcraft rotor according to claim 1, wherein the sleeves are mounted individually on the hub via respective spherical abutment members, and the damper housed in a given sleeve is in hinged engagement with the sleeves via a mounting structure for mounting the spherical abutment member on the hub.

7. A rotorcraft rotor according to claim 1, wherein the lever arm is of generally rectilinear shape.

8. A rotorcraft rotor according to claim 1, wherein the lever arm is of generally dihedral shape.

9. A rotorcraft rotor according to claim 1, wherein the hinge of the damper and the hinge of the linkage with the lever arm are arranged on either side of the hinge of the lever arm with the sleeve.

10. A rotorcraft rotor according to claim 1, wherein the hinge of the lever arm with the sleeve is arranged at one end of the lever arm, and the hinge of the damper and the hinge of the linkage with the lever arm are both arranged at the other end of the lever arm.

11. A rotorcraft rotor according to claim 1, wherein the hinge of the linkage with the lever arm is arranged between the hinge of the lever arm with the sleeve and the hinge of the damper with the lever arm.

12. A rotorcraft rotor according to claim 1, wherein the damper may equally well be a cylindrical damper providing damping in twisting or an elongate damper providing damping in traction/compression.

13. A rotorcraft rotor according to claim 1, wherein the damper is an elongate damper extending inside the sleeve in the general direction in which the sleeve extends, with one of its ends, considered as being a distal end, being hinged to the lever arm, and with the other end of its ends, considered as being a proximal end, being hinged equally well to the sleeve or to the hub.

14. A rotorcraft rotor according to claim 1, wherein the sleeve is arranged as a cover for confining the damper and for housing the lever arm, said cover having a window passing therethrough for passing a branch of the lever arm to which the linkage is hinged.

15. A rotorcraft rotor according to claim 1, wherein the sleeve includes means for cooling the damper.

16. A rotorcraft rotor according to claim 15, wherein the sleeve is arranged as a cover for confining the damper and for housing the lever arm, said cover having a window passing therethrough for passing a branch of the lever arm to which the linkage is hinged, and wherein the cover formed by the sleeve includes at least one forced-air passage passing therethrough for cooling the damper.

17. A rotorcraft rotor according to claim 15, wherein the body of the damper is provided with a finned heat exchanger.

18. A rotorcraft rotor according to claim 1, wherein said engagement member engaging the linkage with the hub is an attachment member incorporated equally well with the hub or with a sleeve adjacent to the sleeve housing the damper engaged with said linkage.

19. A rotorcraft rotor according to claim 1, wherein the linkage includes at least one transmission element, if not a set of hinged-together transmission elements.

20. A rotorcraft fitted with a rotor according to claim 1.

* * * * *